United States Patent
Kobayashi et al.

[19]

[11] Patent Number: 5,835,240
[45] Date of Patent: *Nov. 10, 1998

[54] FACSIMILE COMMUNICATION SUPPLEMENTARY SERVICE DEVICE

[75] Inventors: Yoshimi Kobayashi, Saitama; Hideki Amano, Tokyo, both of Japan

[73] Assignee: Kokusai Denshin Denwa Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 701,718

[22] Filed: Aug. 22, 1996

[30] Foreign Application Priority Data

Sep. 7, 1995 [JP] Japan .................................. 7-254484
Jul. 23, 1996 [JP] Japan .................................. 8-212111

[51] Int. Cl.$^6$ .............................. H04N 1/32; H04M 15/00
[52] U.S. Cl. ........................ 358/468; 358/440; 358/442; 379/143; 379/114
[58] Field of Search ..................... 358/440, 434, 358/435, 436, 438, 439, 402, 405, 401, 400, 442; 379/100.01, 132, 123, 143–153, 155, 114, 121, 126, 144; 455/406

[56] References Cited

U.S. PATENT DOCUMENTS

| | | | |
|---|---|---|---|
| 4,481,383 | 11/1984 | Madon | 179/7.1 R |
| 4,847,891 | 7/1989 | Kotani | 379/88 |
| 4,891,836 | 1/1990 | Takahashi | 379/100 |
| 4,902,881 | 2/1990 | Janku | 235/381 |
| 5,153,744 | 10/1992 | Nobuta | 358/400 |
| 5,265,153 | 11/1993 | Ozawa | 358/401 |
| 5,325,290 | 6/1994 | Cauffman et al. | 364/401 |
| 5,369,680 | 11/1994 | Borbas et al. | 379/1 |
| 5,393,964 | 2/1995 | Hamilton et al. | 235/381 |

*Primary Examiner*—Edward L. Coles
*Assistant Examiner*—Madeleine A-V Nguyen
*Attorney, Agent, or Firm*—Westman, Champlin & Kelly, P.A.

[57] ABSTRACT

The object of this invention is to provide a facsimile communication supplementary service device that allows facsimile communication users to receive accurate service information from telephone switching facilities without performing any operations whatsoever. When a call is received, the facsimile signal analysis and decision part determines whether said call is a facsimile signal, and if it is, monitors the communication until it is completed. When the communication is completed, the charging system calculates the communication charge and the facsimile response part prepares the facsimile information. Then, if the originating party requested for the automatic immediate charge notification service, then the system calls back the originating terminal and sends said facsimile information. As a result, the originating terminal, if it is a facsimile terminal, can receive information on communication charge as a facsimile message. Consulting information may also be added to said charge information.

5 Claims, 5 Drawing Sheets

FACSIMILE COMMUNICATION SUPPLEMENTARY SERVICE DEVICE

BACKGROUND OF THE INVENTION

1. Field of the Invention

This invention concerns a facsimile communication supplementary service device, particularly the facsimile communication supplementary service device that allows facsimile device users to easily and accurately use services pertaining to facsimile communications provided by telephone switching facilities.

2. Description of the Related Art

The transmitting side in a facsimile communication has conventionally used the communication control report or error report generated by the facsimile terminal to determine whether the document has been sent to the other party. The communication charges are calculated by using the communication duration clocked by the facsimile terminal's timer and the rate table in the facsimile.

On the other hand, in international telephone, there is a service called automatic immediate charge notification service that immediately notifies the user of the international telephone charge after the call. A user can use this service by entering the predetermined prefix before the normal telephone number. When the telephone switching facility receives a telephone number following the prefix, it calls back the user after the call to notify the user in voice of the call duration (minutes) and the call charge.

Whereas the conventional means of confirming the communication and controlling the communication charge with the communication control report and error report inform the user whether the communication has been successful, if the communication has been unsuccessful, it does not inform the user why. For example, the user could not determine whether the unsuccessful facsimile communication is caused by incompatible communication speed since the terminating side is a personal computer or by the difference in signal level setting. In addition, since the facsimile terminal has the rate table, it faces the problem of not being able to adequately meet the complex rate systems devised in recent years. In international telephone, in particular, the rate systems are complex as the rates differ by the destination country and region and the time of the day that the service is used, for example. Therefore, it has been extremely difficult to provide users with communication charges with the degree of accuracy that is satisfactory to users.

Furthermore, since the aforementioned automatic immediate charge notification service is provided in voice, senders of facsimile messages must manually switch the telephone line from facsimile terminal to telephone terminal after the facsimile transmission, then wait for the charge notification from the telephone switching facility. This, consequently, has created the problem of inconvenient controls. Another problem is that if the user fails to perform the controls correctly, he may fail to hear the communication charge notice. In addition, if the user is not familiar with the controls, he cannot receive the service although the notice on the charge is being provided by the telephone switch facility.

SUMMARY OF THE INVENTION

The object of this invention is to eliminate the aforementioned problems with the prior art and to provide a facsimile communication supplementary service device that allows the switching facility to automatically determine whether the originating terminal is a telephone or a facsimile and, if a facsimile, accurately receive the service information from the telephone switching facility without the need for the facsimile communication user to perform any operations whatsoever. The other object of this invention is to provide a facsimile communication supplementary service device that can reduce the work load on telephone switch operators.

To achieve the aforementioned objects, this invention is characterized in that it comprises a means for determining whether a call input is a call requesting for automatic immediate charge notification service, a means for temporarily storing the telephone number of the originating terminal in memory if the call is a call requesting for automatic immediate charge notification service, a means for determining whether the signal over the speech path corresponding to the call input is a facsimile signal and, if so, for monitoring and analyzing the exchanged signals, a charge calculation means for calculating and deriving the communication charge after the completion of the facsimile communication, a means for preparing said communication charge as facsimile information, and a means for calling back the aforementioned originating terminal using the telephone number of said originating terminal and sending the aforementioned facsimile information on communications charge to said originating terminal. This invention is also characterized in that when an error occurs, consulting information on how to solve said error is added to said information on communications charge.

According to this invention, if the originating terminal is a facsimile machine, then the automatic immediate charge notification service is provided as facsimile information. As a result, the user of the originating terminal can receive the charge notice without performing any operations. Consequently, the originating terminal can easily receive accurate charge notice. Furthermore, when an error occurs to facsimile communications, the user of the originating terminal can receive information on how to solve the error.

DETAILED DESCRIPTION OF THE PREFERRED EMBODIMENT

Figure 1:
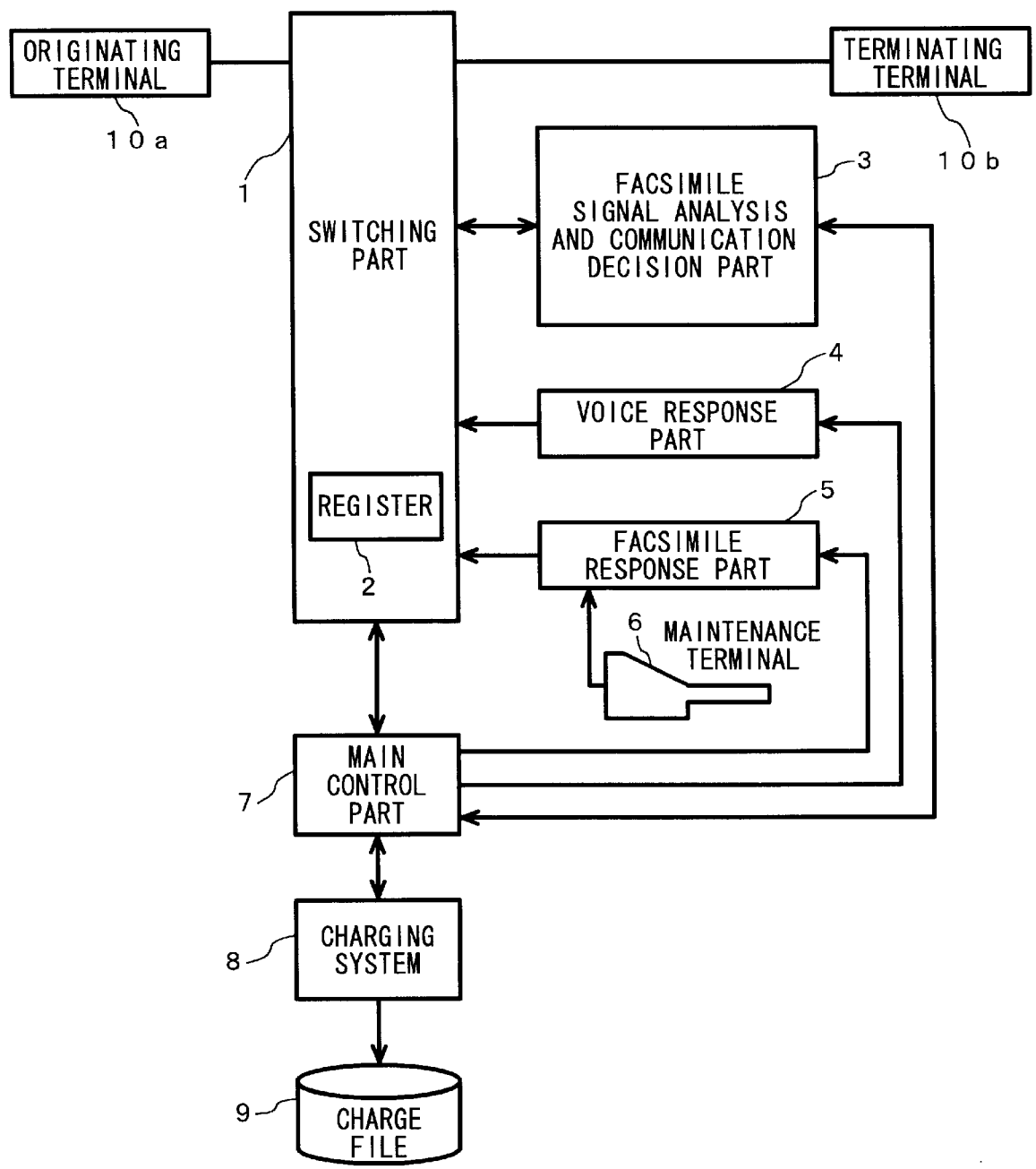
FIG. 1 is a block diagram that shows an outline of the system configuration of the first embodiment of this invention.

The invention is described in detail by referring to the drawings. FIG. 1 is a block diagram of a switching facility that is an embodiment of this invention.

In the figure, switching part 1 is a publicly-known switchboard of a telecommunications carrier. When switching part 1 receives a call from an originating terminal that may be a facsimile machine or a telephone, it identifies the contents of the dialed number, seizes an outgoing line, and establishes the communication circuit with the terminating terminal. Register 2 that is installed in said switching part 1 functions to store the terminal number of the originating side in order to call back the originating terminal to provide charge information or provide notification on the results of the communication, for example. Facsimile signal analysis and communication decision part 3 monitors the communication circuit to determine whether the signal sent by the originating side terminal is an audible signal or facsimile signal. If said signal is a facsimile signal, the facsimile signal analysis and communication decision part 3 continues to monitor the communication circuit until the communication is completed and collects communication information from the facsimile communication protocol. Details of said fax signal analysis and decision part 3 will be provided later using FIG. 2.

If the communication took place in voice, then voice response part 4 translates the charge information into voice, calls back the telephone number stored in the aforementioned register 2, then notifies the originating terminal of the charge. For example, the notification may be, "This is X. The call to destination Y was A minutes and B seconds, and the charge is C yen." The facsimile response part 5 prepares a message to send to the originating terminal, a facsimile machine, then sends the message to the telephone number stored in the aforementioned register 2. If the document transmission is completed successfully, then this message would provide the communication duration, charge, and the number of pages transmitted, for example. If said document transmission was terminated before all the pages could be transmitted, then the message would contain the various communication information obtained from the fax signal analysis and decision part 3 such as the cause of aborted communication, the number of pages transmitted, and consulting information on how to eliminate the problem, for example, that would be sent as one page along with the charge information. Maintenance terminal 6 is composed of a switchboard, etc., and is a device for updating the consulting information, etc.

Main control part 7 controls the operations of the aforementioned switching part 1, fax signal analysis and decision part 3, voice response part 4, fax response part 5, charging system 8, etc. Said charging system 8 calculates the communication charge based on the location of the other party to the communication, communication duration, communication time, etc., by referring to the rate table. In the case of facsimile communication, if the communication is aborted, then the charging system 8 calculates the communication charge for the number of pages successfully transmitted.

Charge file 9 contains charge information either chronologically or by the terminating terminal number, information history on causes of facsimile communication errors, success or failure in notifying of the charge, etc.

Furthermore, connected to the switching facility of the aforementioned configuration via lines are originating terminal 10a and terminating terminal 10b. These terminals, 10a and 10b, may be telephones, facsimile machines, etc.

Figure 2:
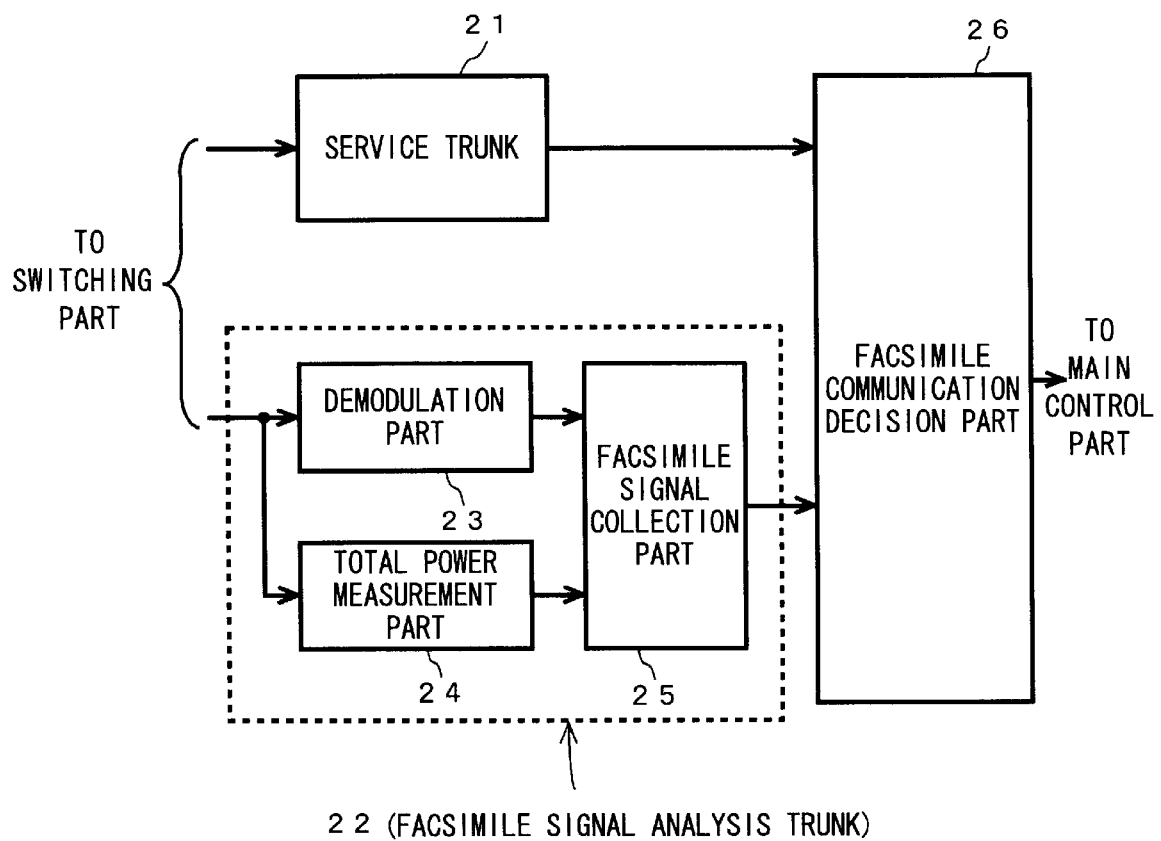
FIG. 2 is a block diagram that shows a specific example of the facsimile signal analysis and decision part of FIG. 1.

Next, the configuration and operations of the aforementioned fax signal analysis and decision part 3 are described in detail. FIG. 2 is a block diagram showing the configuration of said fax signal analysis and decision part 3.

In the figure, service trunk 21 identifies the audible frequency signal input via switching part 1 as telephone switch audible signal tone such as voice or busy tone or as facsimile signal tone. The service trunk 21 is a publicly known technology as described in Patent Disclosure Showa 62-204652 public notice, for example, so its description is omitted here.

Facsimile signal analysis trunk 22 collects facsimile signals, monitors signal errors, and measures electric power. Demodulation part 23 demodulates the encoded and modulated facsimile signals input via switching part 1. In essence, demodulation part 23 demodulates the signals of the communication protocols transmitted in facsimile communication and notifies facsimile signal collection part 25 of the information. Total power measurement part 24 continuously measures over a designated amount of time the power of the audible frequency signal over the total band input via switching part 1 and measures the maximum, average, and minimum power.

Then, total power measurement part 24 notifies signal facsimile signal collection part 25 of the information. Facsimile signal collection part 25 collects the facsimile signals demodulated by the aforementioned demodulation part 23 and collects the error results of signals, and it also collects power measurement results from total power measurement part 24.

If the audible frequency signal over the speech path that is input to the aforementioned service trunk 21 via switching part 1 is identified as a data tone such as facsimile signal tone, facsimile communication decision part 26 compares the signal received from said facsimile signal collection part 25 against the stipulated communication protocol signals to monitor the progress of facsimile communication. The facsimile communication decision part 26 also analyzes the communication status of facsimile communications such as noise level and communication signal level decision. The facsimile communication decision part 26 also checks the output results of total power measurement part 24. The facsimile communication decision part 26 then checks whether said facsimile communication was successful or unsuccessful and if unsuccessful, finds the cause of the failure. The facsimile communication decision part 26 also measures the communication duration. These check results and measurement results are sent to main control part 7.

Facsimile signal analysis and decision part 3 is composed of the aforementioned service trunk 21, demodulator 23, total power measurement part 24, facsimile signal collection part 25, and facsimile communication decision part 26. A number of facsimile signal analysis and decision parts 3 are installed in parallel so they can determine whether signals over a number of speech paths are facsimile signals and if they are facsimile signals, monitor the signals, at the same time and in parallel.

Figure 3:
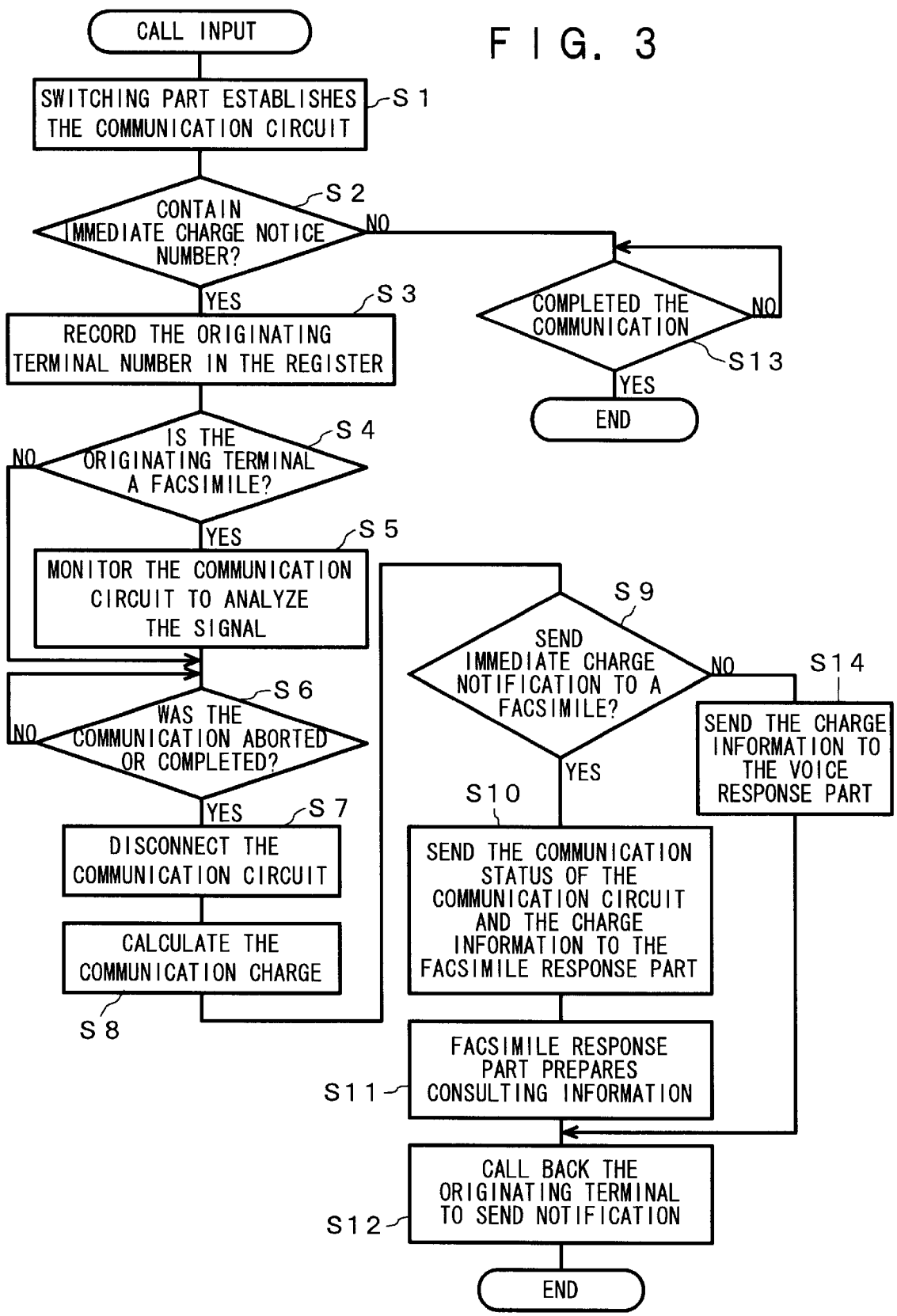
FIG. 3 is a flow chart that explains the operations of the first embodiment of this invention.

Next, the operations of the embodiment are explained by referring to the flowchart in FIG. 3. When a call is received by the switching facility of this embodiment, switching part 1 establishes the communication circuit at step S1. At step S2, the main control part 7 determines whether there is a predetermined prefix before the normal telephone number, and if there is, it determines whether said prefix is an automatic immediate charge notification service identification number. For example, if the prefix "OOX" is placed before the terminating terminal number, the main control part 7 judges the number as an automatic immediate charge notification service identification number.

If the decision is positive, the system proceeds to step S3 and temporarily registers the originating terminal number in the aforementioned register 2. If the decision is negative, or if the communication is a normal communication and not one requesting for the automatic immediate charge notification service, then the system proceeds to step S13 where to determine whether the communication has been completed. When this decision is positive, the communication is completed.

At step S4, a decision is made as to whether the originating terminal is a facsimile machine. If said decision is positive, then the system proceeds to step S5. At step S5, the aforementioned facsimile signal analysis and decision part 3 monitors the signals that are exchanged over the speech path to monitor that the communication is proceeding normally. If the communication is interrupted or completed, then the system proceeds to step S6. If the decision at the aforementioned step S4 is negative, or when the originating terminal is not a facsimile terminal, then the system proceeds to step S6.

At step S6, the system decides whether the communication has been interrupted or completed. If this decision is positive, then the system proceeds to step S7 and the communication circuit is disconnected. At step S8, charging system 8 calculates the communication charge. The charging system 8 calculates the charge based on the transmission start time and end time. In addition, in the case of facsimile communication, the charging system 8 adjusts the charges such as calculating the charges only for successfully transmitted pages and excluding the charges for failed transmission pages.

At step S9, a decision is made as to whether the terminal that is promptly notified of the charge, or the originating terminal, is a facsimile terminal. If this decision is positive, then the system proceeds to step S10. At this step, the communication status of the communication circuit and charge information are sent to facsimile response part 5 via main control part 7. At step S11, the aforementioned charge information, consulting information, etc., are prepared by said facsimile response part 5. For example, if the communication is ended while the document information is being transmitted, the way to remedy the cause of the problem is included in the consulting information. When these pieces of information are prepared, the system proceeds to step S12, and facsimile response part 5 translates the information into facsimile signals, calls the telephone number registered in the aforementioned register 2, then sends the aforementioned prepared information.

If the aforementioned decision at step S9 is negative, then the system proceeds to step S14. At step S14, voice response part 4 is notified of the communication charge information derived by calculation by the aforementioned charging system 8 via main control part 7. Voice response part 4 translates the charge information into voice and prepares to transmit the voice. Later, the system proceeds to the aforementioned step S12, calls back the originating side, and notifies the originating side of the communication charge.

Figure 4:
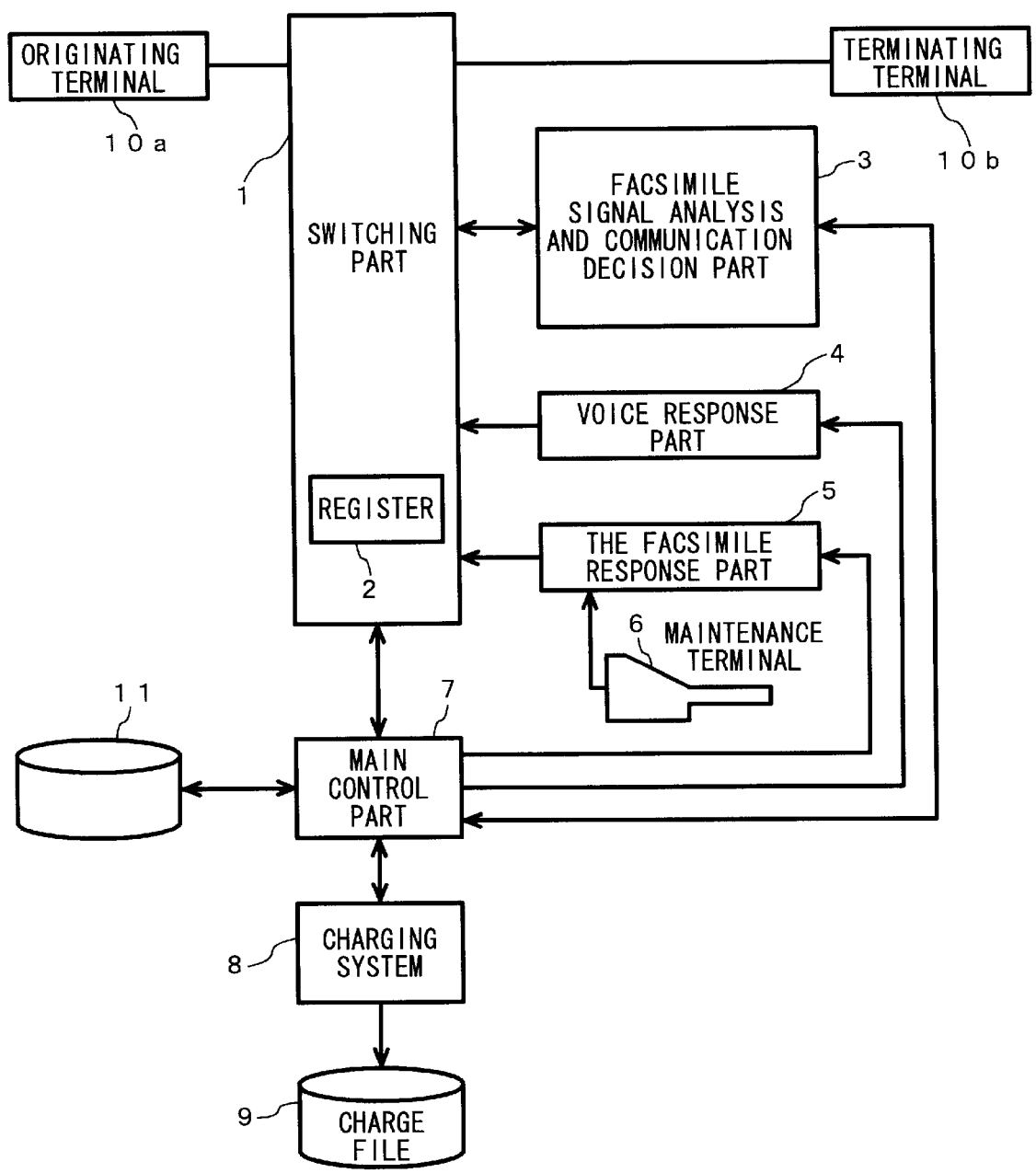
FIG. 4 is a block diagram that shows an outline of the system configuration of the second embodiment of this invention.
Figure 5:
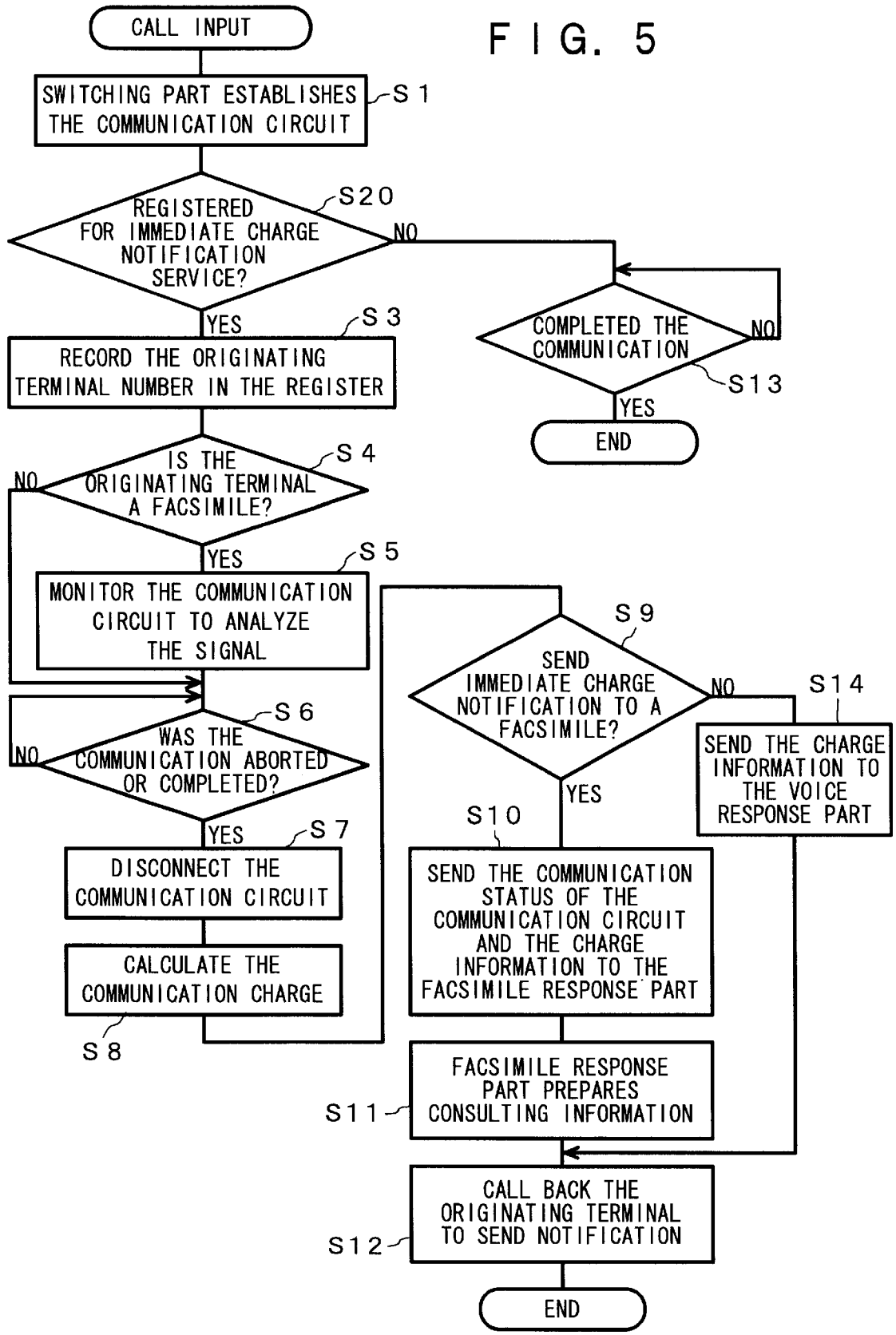
FIG. 5 is a flow chart that explains the operations of the second embodiment of this invention.

Next, the second embodiment of this invention is explained by referring to FIGS. 4 and 5. This embodiment is unique in that whether the originating party wishes to receive the automatic immediate charge notification service is determined by referring to database 11. Database 11 holds personal information on communication users. Said personal information includes data including the address, name, registration for automatic immediate charge notification service, and whether the information user is in arrears on the payment of charges based on the telephone number of the originating party.

When a call is received, main control part 7 is notified of the telephone number of the originating terminal. From said telephone number, main control part 7 can determine whether the originating party is registered for automatic immediate charge notification service.

Next, the operations of the unique parts of said second embodiment are explained by referring to FIG. 5. The only difference between FIG. 3 and FIG. 5 is that step S2 in FIG. 3 has been replaced with step S20 in FIG. 5. When a call is received by the switching facility, at step S1, the switching part 1 establishes the communication circuit. Then, at step S20, main control part 7 refers to database 11 to determine whether the originating party is registered for the automatic immediate charge notification service. If this decision is positive, then the system proceeds to step S3 and the originating terminal number is recorded in register 2. Operations beyond this step are omitted here as they are the same as those in FIG. 3.

As is clear from the explanation above, according to this invention, if the originating terminal is a facsimile terminal, its user can receive the immediate charge notification positively and accurately without performing any operations since the service is provided as facsimile information. Furthermore, if an error occurs in facsimile communication and it is interrupted, consulting information on how to remedy said error is provided to the originating terminal as facsimile information. Therefore, the originating terminal can take prompt action against said error.

In addition, according to this invention, the immediate charge notification can be received both positively and accurately. Therefore, the number of inquiries on charges, etc., from the users of facsimile machines to telecommunications carriers will decrease. Consequently, this invention can reduce the work load on both users and operators. In addition, since the invention makes it possible to take measures such as not to charge documents whose transmission is not completed in facsimile communication, the telecommunications carrier can notify its users of charges that are commensurate with its charge policies.

What is claimed is:

1. A facsimile communication supplementary service device for use in a switching facility and having a facsimile response part and a voice response part comprising:

means for determining whether a call from an originating terminal received over a speech path at the switching facility is a call requesting automatic immediate charge notification service, means for temporarily storing the telephone number of the originating terminal in memory if the call is one requesting the automatic immediate charge notification service, means for determining whether the signals over the speech path corresponding to the received call are facsimile signals or telephone signals, means for monitoring and analyzing the signals exchanged over the speech path if they are facsimile signals, charge calculation means for calculating and deriving a communication charge after the completion of the communication, means for communicating said communication charge to the facsimile response part in which the communication charge is prepared as facsimile information if the signals over the speech path are facsimile signals, and to the voice response part in which the communication charge is prepared as voice information if the signals over the speech path are telephone signals, and means for calling back the aforementioned originating terminal using the telephone number of said originating terminal and sending the communication charge selectively for one of the aforementioned facsimile information and voice information to said originating terminal, wherein if the signals received from the originating terminal at the switching facility are facsimile signals then the communication charge is sent to the originating terminal as a facsimile, and wherein if the signals received from the originating terminal at the switching facility are telephone signals then the communication charge is sent to the originating terminal as a voice message.

2. The facsimile communication supplementary service device in claim 1, wherein the facsimile communication supplementary service device is characterized in that a decision is made as to whether a call input is one requesting the automatic immediate charge notification service based on part of the telephone number when the call is received.

3. The facsimile communication supplementary service device in claim 1, wherein the facsimile communication supplementary service device is characterized in that a decision is made as to whether a call input is one requesting the automatic immediate charge notification service based on the data registered in a database.

4. The facsimile communication supplementary service device in claim 1, wherein the facsimile communication supplementary service device is characterized in that when the aforementioned means of monitoring and analyzing the exchanged signals finds an error in the communication, consulting information on ways to remedy said error is transmitted to the originating terminal in addition to the aforementioned charge information.

5. The facsimile communication supplementary service device in claim 1, wherein the facsimile communication supplementary service device is characterized in that the aforementioned charge calculation means calculates the communication charge for facsimile signals only for documents whose transmission is successful.

* * * * *